United States Patent [19]
Zolotoochin et al.

[11] Patent Number: 5,989,505
[45] Date of Patent: Nov. 23, 1999

[54] METHOD FOR RECOVERY OF ALKALI VALUES FROM TRONA USING AIR STRIPPING

[75] Inventors: Vladimir M. Zolotoochin, The Woodlands, Tex.; James D. Phillip; David S. Luzmoor, both of Green River, Wyo.

[73] Assignee: Solvay Minerals, Inc., Houston, Tex.

[21] Appl. No.: 08/617,394

[22] Filed: Mar. 18, 1996

[51] Int. Cl.[6] .............................. C22B 26/10; C01D 7/37
[52] U.S. Cl. ....................................... 423/206.2; 423/427
[58] Field of Search ................................. 423/427, 206.2, 423/426

[56] References Cited

U.S. PATENT DOCUMENTS

| | | |
|---|---|---|
| 1,853,275 | 4/1932 | Houghton et al. . |
| 1,865,833 | 7/1932 | Chesny . |
| 2,005,868 | 6/1935 | MacMullin .............................. 423/427 |
| 2,049,249 | 7/1936 | Cunningham . |
| 2,055,084 | 9/1936 | Mullin . |
| 2,133,455 | 10/1938 | Keene et al. . |
| 2,193,817 | 3/1940 | Houghton . |
| 2,388,009 | 10/1945 | Pike . |
| 2,625,384 | 4/1953 | Pike et al. . |
| 2,704,239 | 3/1955 | Pike . |
| 3,028,215 | 4/1962 | Frint . |
| 3,050,290 | 8/1962 | Caldwell et al. . |
| 3,104,942 | 9/1963 | Handwerk et al. . |
| 3,113,834 | 12/1963 | Beecher et al. . |
| 3,119,655 | 1/1964 | Frint et al. . |
| 3,184,287 | 5/1965 | Gancy et al. . |
| 3,212,848 | 10/1965 | Tasiaux . |
| 3,246,962 | 4/1966 | Miller . |
| 3,264,057 | 8/1966 | Miller ....................................... 423/427 |
| 3,451,767 | 6/1969 | Saeman et al. . |
| 3,455,647 | 7/1969 | Gloster . |
| 3,479,134 | 11/1969 | Warzel . |
| 3,498,744 | 3/1970 | Frint et al. . |
| 3,667,902 | 6/1972 | Kay et al. . |
| 3,870,780 | 3/1975 | Guptill . |
| 3,953,073 | 4/1976 | Kube . |
| 3,984,527 | 10/1976 | Gancy et al. . |
| 4,039,617 | 8/1977 | Kuo . |
| 4,039,618 | 8/1977 | Gancy et al. . |
| 4,148,684 | 4/1979 | Farin . |
| 4,252,781 | 2/1981 | Fujita . |
| 4,283,372 | 8/1981 | Frint et al. . |
| 4,285,915 | 8/1981 | Saldick et al. . |
| 4,344,650 | 8/1982 | Pinsky et al. . |
| 4,401,635 | 8/1983 | Frint . |
| 4,498,706 | 2/1985 | Ilardi et al. . |
| 4,652,054 | 3/1987 | Copenhafer et al. . |
| 4,652,437 | 3/1987 | Nakaya et al. . |
| 4,654,204 | 3/1987 | Copenhafer et al. . |
| 4,743,439 | 5/1988 | Ready . |
| 4,869,882 | 9/1989 | Dome et al. . |
| 5,043,149 | 8/1991 | Frint et al. . |
| 5,262,134 | 11/1993 | Frint et al. . |
| 5,275,794 | 1/1994 | Luna . |
| 5,283,054 | 2/1994 | Copenhafer et al. . |
| 5,609,838 | 3/1997 | Neuman et al. ........................ 423/427 |

FOREIGN PATENT DOCUMENTS

| | | |
|---|---|---|
| 15822 | of 1892 | United Kingdom . |
| 883202 | 11/1961 | United Kingdom . |

OTHER PUBLICATIONS

Sarber, M. et al. "The Activity and Osmotic Coefficients of Aqueous Sodium Bicarbonate Solutions," *J. Chem. Thermodynamics*, vol. 14, pp. 967–976 (1982), No Month.

(List continued on next page.)

*Primary Examiner*—Steven Bos
*Attorney, Agent, or Firm*—Brinks Hofer Gilson & Lione

[57] ABSTRACT

A process for recovery of alkali values from trona in which trona is dissolved, the sodium carbonate in the feed solution is converted to sodium bicarbonate by introducing carbon dioxide, sodium bicarbonate is crystallized and separated from a mother liquor, and sodium bicarbonate in the mother liquor is converted to sodium carbonate by introducing air to form a recirculating dissolving solution which is used to dissolve the trona.

18 Claims, 1 Drawing Sheet

OTHER PUBLICATIONS

Vanderzee, C., "Thermodynamic properties of Solutions of a Hydrolyzing Electrolyte: relative partial molar enthalpies . . . and solute activity coefficients of aqueous sodum [sic] carbonate," *J. Chem. Thermodyanamics*, vol. 14, pp. 1051–1067 (1982), No Month.

Butler, J. N., *Carbon Dioxide Equilibria and Their Applications*, Lewis Publishers, Chelsea MI 1991, No Month.

Garrett, D., *Natural Soda Ash*, Von Nostrand Reinhold, New York, NY, 1992, pp. 336–355, No Month.

Harned, H., and Mannweiler, G., "The Thermodynamics of Ionized Water in Sodium Chloride Solutions," vol. 57, pp. 1873–1876 (Oct. 1935).

Yakovlev, V. A., et al., "Constant of the Second–Stage of Dissociation of Carbonic Acid in Concentrated Solutions of Sodium Sulfate," *Zh. Prikl. Khim* (Leningrad), vol. 62, No. 6, pp. 1365–1366 (1989), No Month.

Rao, D. P., "Design of Packed Towers for Absorption and Desorption of Carbon Dioxide Using Hot Promoted Potassium Carbonate Solution," *Gas Separation & Purification*, vol. 5, pp. 177–180 (1991), Sep.

Pohorecki, R., and Kucharski, E., "Desorption with Chemical Reaction in the System $CO_2$–aqueous Solution of Potassium Carbonate," *Chemical Engineering Journal*, vol. 46, pp. 1–7 (1991), No Month.

Peiper, J. And Pitzer, K., "Thermodynamics of Aqueous Carbonate Solutions Including Mixtures of Sodium Carbonate, Bicarbonate and Chloride," *J. Chem. Thermodynamics*, vol. 14, pp. 618–638 (1982), No Month.

Mahajani, V.V. and Danckwerts, P. V., "The Stripping of $CO_2$ from Amine Promoted Potash Solutions at 100° C", *Chemical Engineering Science*, vol. 38, pp. 321–327 (1983), No Month.

Nii, S., et al., "Regeneration of $CO_2$–Loaded Carbonate Solution by Reducing Pressure," *J. Chem. Eng. of Japan*, vol. 14, No. 2, pp. 148–153 (1995), No Month.

Taylor, E., "Thermodynamics of Sodium Carbonate in Solution," *Institute of Paper Chemistry*, pp. 653–657, reprinted Jul., 1955.

Eickmeyer, A. G. "Carbon Dioxide Removal, IV, Catacarb", *Fertilizer Science Technology Series*, vol. 2, pp. 165–169 (1974), No Month.

Savage, D., et al., "Chemical Absorption and Desorption of Carbon Dioxide from Hot Carbonate Solutions," *Chemical Engineering Science*, vol. 35, pp. 1513–1522 (1980), No Month.

Manufacture of Soda With Special Reference to the Ammonia Process A Practical Treatise, by Te–Pang Hou, Ph.D., Second Edition, pp. 342–345 (1942), No Month.

Geochemistry and Paleolimnology of the Trona Deposits and Associated Authigenic Minerals of the Green River Formation of Wyoming, by W. H. Bradley and H. P. Eugster, Geological Survey Professional Paper 496–B, p. B3, pp. B36–B58 (1969), No Month.

METHOD FOR RECOVERY OF ALKALI VALUES FROM TRONA USING AIR STRIPPING

BACKGROUND OF THE INVENTION

This invention relates to a method of recovering alkali values from trona ore. In particular, this invention relates to a process for producing sodium carbonate via sodium bicarbonate crystallization.

Trona ore is a mineral that contains about 90–95% sodium sesquicarbonate ($Na_2CO_3.NaHCO_3.2H_2O$). A vast deposit of mineral trona is in southwestern Wyoming near Green River. By conservative estimates, this deposit contains about 75 billion metric tons of trona ore.

The sodium sesquicarbonate found in trona ore dissolves in water to yield approximately 5 parts by weight sodium carbonate ($Na_2CO_3$) and 4 parts sodium bicarbonate ($NaHCO_3$). To recover these valuable alkali products, the trona ore must be processed to remove insoluble materials and other impurities.

One such valuable alkali produced from trona is soda ash (a commercial grade of sodium carbonate). Soda ash is one of the largest volume alkali commodities made in the United States. Soda ash finds major use in the glass-making industry and for the production of baking soda, detergents and paper products.

A common method to produce soda ash from trona is known as the "monohydrate process", which requires large quantities of water (a scarce and valuable resource in Wyoming) and energy. In that process, crushed trona ore is calcined (i.e., heated) at a temperature between 125° C. and 250° C. to convert sodium bicarbonate into sodium carbonate, drive off water of crystallization and form crude soda ash. The crude soda ash is then dissolved in water and the insoluble material is separated from the resulting solution.

This clear solution of sodium carbonate is fed to an evaporative crystallizer where some of the water is evaporated and some of the sodium carbonate forms into sodium carbonate monohydrate crystals ($Na_2CO_3.H_2O$). The monohydrate crystals are removed from the mother liquor and then dried to convert it to dense soda ash. The mother liquor is recycled back to the evaporator circuit for further processing into sodium carbonate monohydrate crystals.

The monohydrate process has several disadvantages. Presently, the monohydrate process consumes considerable amounts of water. When the raw trona ore is calcined, the natural water content is evaporated. Yet after that water is evaporated off, more water must be added to dissolve the calcined trona.

In addition to consuming water, the monohydrate process consumes and wastes considerable amounts of energy. Calcining equipment, for example, has only about 50% energy efficiency. Much energy is also wasted in calcining simply to raise the temperature of the sodium carbonate in the trona up to the calcining temperature even though the sodium carbonate itself does not undergo conversion. Additionally, a significant amount of energy is wasted during calcining in evaporating the naturally occurring water in the trona.

Soda ash may also be produced from the "bicarbonate process." One advantage over the "monohydrate process" is that in the "bicarbonate process" the raw trona ore is not calcined. Rather, trona ore is first dissolved and then fed to a carbon dioxide absorber tower to convert the sodium carbonate dissolved from the trona into sodium bicarbonate. Then some of the sodium bicarbonate is crystallized and removed from the resulting mother liquor. The sodium bicarbonate crystals are calcined to convert to soda ash. The mother liquor is recycled to dissolve more trona.

Unfortunately, the bicarbonate process wastes energy by requiring a high liquor recycle ratio to dissolve the trona. This inefficiency is due to the high levels of sodium bicarbonate remaining in the mother liquor after the crystallization step. This is a limiting factor in the amount of trona that can be dissolved in it.

Therefore, there is a need for a process that avoids or minimizes the waste and inefficiencies of the traditional processes for making soda ash.

SUMMARY OF THE INVENTION

In one aspect, this invention is a method for recovering alkali values from underground trona deposits that saves energy and conserves water. In this invention, trona ore is dissolved in a heated solution to form a feed liquor solution containing sodium carbonate and sodium bicarbonate. Carbon dioxide is introduced into the feed liquor to convert sodium carbonate into sodium bicarbonate. The feed liquor, being enriched in sodium bicarbonate beyond saturation, will precipitate bicarbonate crystals, and then is cooled to precipitate more sodium bicarbonate crystals. The sodium bicarbonate crystals are separated from the resulting mother liquor. The sodium bicarbonate crystals are then calcined into a light soda ash. The light soda ash is then densified to form dense sodium carbonate monohydrate crystals. The monohydrate crystals are dried into a dense soda ash product. A gas having a low partial pressure of carbon dioxide is introduced into the mother liquor to convert sodium bicarbonate solution into weak trona solution. The solution is then recycled as a dissolving solution to dissolve raw trona ore.

In another aspect, this invention improves the efficiency and yield of a process for recovering alkali values from underground trona deposits by solution mining, or by leaching of the mined trona ore. A gas having low partial pressure of carbon dioxide is introduced into a recirculating mother liquor that contains sodium bicarbonate and sodium carbonate in a ratio greater than 0.2. The gas causes some of the sodium bicarbonate to convert into sodium carbonate thereby increasing the capacity of the mother liquor to dissolve additional sodium bicarbonate. Trona is dissolved in the mother liquor in greater amounts due to this additional soluble sodium bicarbonate capacity of the mother liquor.

This invention offers energy and raw material savings because additional trona can be dissolved without having to leave behind undissolved sodium bicarbonate, or without having to increase the temperature of the dissolving solution to achieve the same results.

DETAILED DESCRIPTION OF THE INVENTION

Figure 1:
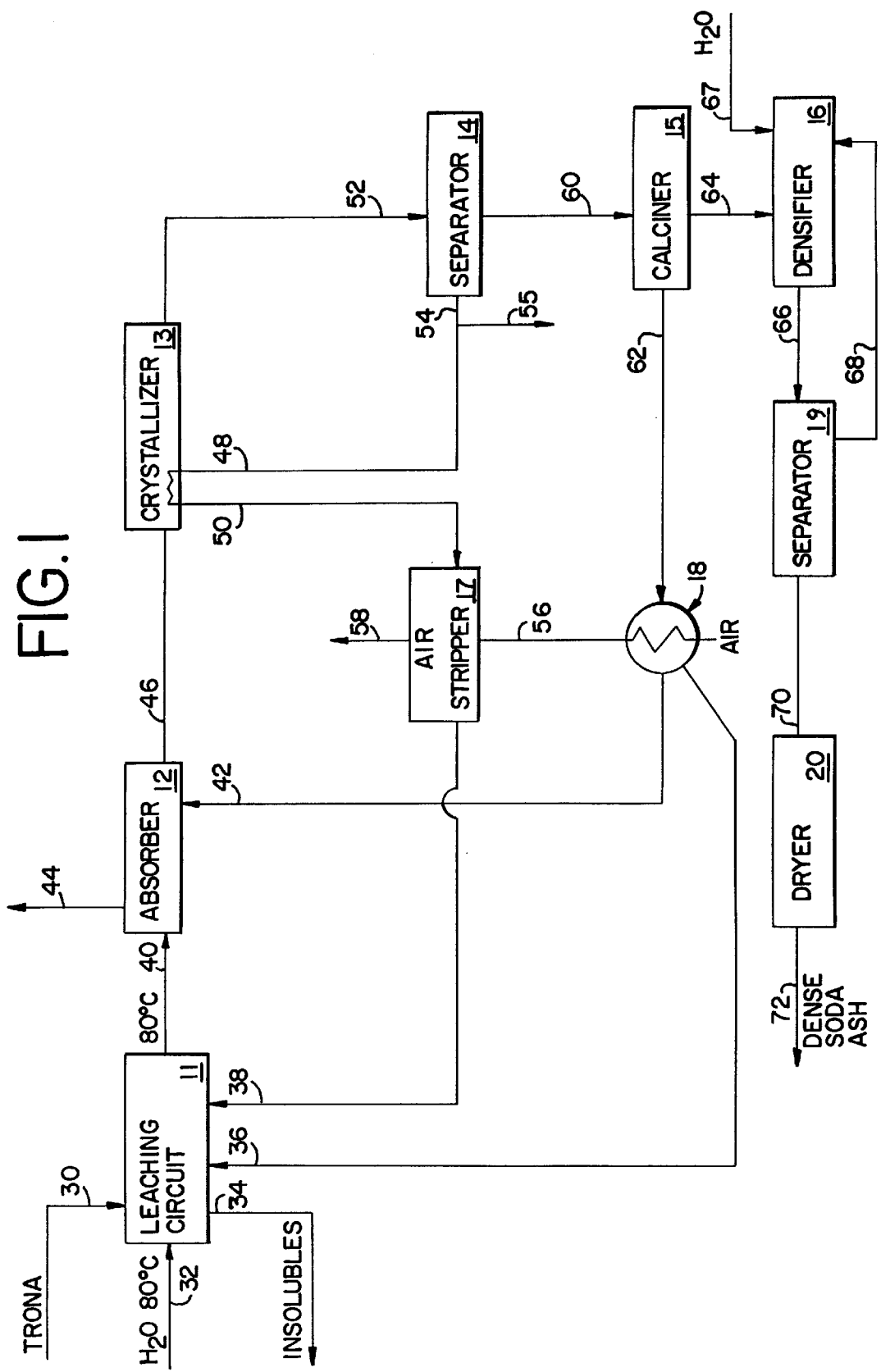
FIG. 1 is a block flow diagram of one embodiment of the present invention.

This invention is very advantageous for the production of sodium bicarbonate which can then be converted to sodium carbonate in the form of dense soda ash. As shown in the embodiment in FIG. 1, the process dissolves trona and removes any insolubles in a leaching circuit 11. The dissolved trona is then sent to a carbon dioxide absorber 12 where sodium carbonate is converted into sodium bicarbonate. This solution, now enriched in sodium bicarbonate, is sent to a crystallizer 13 where sodium bicarbonate crystals form. The slurry is sent to separator 14 where the crystals are separated from the resulting mother liquor. The mother liquor is passed to a stripper 17. Air is introduced into the mother liquor in the stripper 17. The air converts some of the sodium bicarbonate to sodium carbonate so that the mother liquor can more efficiently be used as a dissolving solution in leaching circuit 11.

The sodium bicarbonate crystals that were separated are passed to a calciner 15 where they are converted to a light soda ash. During this process, an off-gas containing carbon dioxide and water vapor is produced. This off-gas is sent through a condenser 18 where the water vapor condenses out and is returned to the leaching circuit 11. The carbon dioxide, however, is passed to the absorber 12 where the carbon dioxide is used to convert sodium carbonate into sodium bicarbonate. The light soda ash from the calciner is passed to a densifier 16 where it is converted to sodium carbonate monohydrate crystals. These crystals are passed to a separator 19 to remove excess liquid. The crystals are then passed to a drier 20 where the moisture is driven off and dense soda ash is formed.

Specifically, the process begins by introducing trona ore via line 30 into the leaching circuit 11. The leaching circuit may include either a dissolving trommel or an agitated dissolving tank. Typically, trona ore is mined underground and then transferred to the surface. Generally, additional crushing or screening of the mined trona ore is not required before placing it into a dissolving trommel, but such screening would be required if a dissolving tank were used.

As an alternative, or supplement, to using mined trona ore, feed liquor may be derived from solution mining liquors obtained by any solution mining techniques. Also, mine water collected from the trona mine, such as the slurrying solution run-off from underground tailings disposal or water seepage into the mine shaft, may be used with this invention.

In the leaching circuit 11, heated make-up water is added via line 32. The majority of the dissolving solution is the recycled weak liquor fed via line 38. Preferably, the dissolving solution contains a ratio of sodium bicarbonate to sodium carbonate between about 4:13 and about 4:1. Most preferably, the dissolving solution has a ratio of about 4:5.

One objective of the leaching circuit 11 is to dissolve practically all the sodium carbonate and sodium bicarbonate in the trona ore feed. Another objective of the leaching circuit 11 is to produce a feed liquor coming out of the leaching circuit 11 through line 40 with sufficient sodium carbonate and sodium bicarbonate concentration to maximize certain process efficiencies, as discussed below. Therefore, the trona is dissolved in a dissolving solution that has been heated to a temperature between about 20° C. and 100° C. This produces a feed liquor having a total equivalent carbonate concentration of at least about 11%. "Total equivalent carbonate" means the concentration of sodium carbonate in solution plus the concentration of sodium bicarbonate in solution expressed as the equivalent weight of sodium carbonate.

For cost purposes, the resulting feed liquor should contain as much dissolved trona as possible, which can be accomplished by raising the dissolving temperature. On the other hand, it is desirable that the dissolving temperature not be so high as to require expensive pressure-retaining equipment. Green River, Wyo., is at a high altitude of about 6500 feet, where water boils at about 95° C. Due to the boiling point elevation related to the concentration of dissolved salts, trona solutions generally boil at about 99° C. in Green River, Wyo. Therefore, for operations at Green River, it is preferred that the trona be dissolved at a temperature less than about 99° C.

At the other extreme, it is preferred that the trona be dissolved at a temperature no less than about 20° C. The dissolving temperature can be lower and yet sufficient trona will still be dissolved to practice this invention, but the yield per pass will be so low that it would not be practical to operate.

A practical yield per pass can be achieved when the trona is dissolved at about 50° C. It is more preferred to dissolve the trona at about 70° C. or above for a higher yield per pass. To obtain the maximum yield per pass of recirculating liquor, it is desirable for the dissolving temperature to be as high as practically possible. Due to the practical problems associated with operating near the solution boiling point, it is preferred to dissolve the trona at about less than 90° C. Most preferably, the dissolving temperature is 80° C.

In the leaching circuit 11, it is important to maintain not only the temperature, but also the ratio of trona feed to dissolving solution. Insufficient amounts of trona would result in an unsaturated feed liquor having lower concentrations of sodium carbonate and sodium bicarbonate causing reduced yields and inefficient operations. Excess amounts of trona may result in incongruent dissolution of trona in the leaching circuit leaving some undissolved sodium bicarbonate. Too much sodium bicarbonate in the starting dissolving solution would have the same effect.

Because trona ore can contain up to 10% insoluble materials, it is important that all the soluble material is dissolved in the leaching circuit to minimize the alkali value disposed of with the insolubles via line 34. Portions of the make up water via line 32 and the condensate via line 36 can be used in a washing section to wash alkali value back into the dissolving section of the leaching circuit 11. The majority of the dissolving solution is the recycled liquor coming in through line 38.

At the preferred dissolving temperature of 80° C., a clear feed liquor is produced from the leaching circuit 11 that contains a concentration of about 13.6 weight percent sodium carbonate and about 10.8 weight percent sodium bicarbonate. The clear feed liquor is introduced via line 40 into a carbon dioxide absorber tower 12. Carbon dioxide is introduced via line 42 at the bottom of this tower 12 and is introduced into the feed liquor solution. The carbon dioxide reacts with sodium carbonate to produce sodium bicarbonate. Excess carbon dioxide gas is vented via line 44.

Preferably, in the absorber tower 12, substantially all of the sodium carbonate is converted to sodium bicarbonate. However, complete conversion may not be economically practical. Nevertheless, operating the absorber tower at higher temperatures results in better carbon dioxide absorption into the feed liquor and better conversion rates. As the sodium carbonate gets converted into sodium bicarbonate, the solution becomes supersaturated with sodium bicarbonate, causing sodium bicarbonate to crystallize. Operating at higher temperatures results in better crystal formation. Although special column packing and trays may be available that can handle some solids, it is believed that an empty column may be preferable to avoid any problems with plugging of the tower internals from the sodium bicarbonate crystals that may form.

The feed liquor, enriched in sodium bicarbonate, is fed to the crystallizer 13 via line 46 where the solution is cooled to between about 23° C. and about 17° C. Preferably, the solution is cooled to about 20° C. By cooling the solution, additional sodium bicarbonate crystals form. A forced circulation crystallizer may be used to produce the sodium bicarbonate crystals. With the temperature decrease of the feed liquor from about 80° C. down to about 20° C,, a single-stage crystallization process may be adequate to grow good quality crystals. Alternatively, a two-stage crystallization process may be used when the feed liquor temperature is significantly high to cool down the feed liquor in two steps.

In this embodiment, sodium bicarbonate crystals form in both the carbon dioxide absorber tower 12 and the crystallizer 13. Between both process steps, about 75 weight percent of the alkali value in the combined recirculating and original feed liquor crystallizes and may be recovered for each pass through the process when operating with a dissolving temperature of about 80° C. In comparison, about 66 weight percent of the sodium valve may be recovered when operating with a dissolving temperature of about 50° C.

The sodium bicarbonate crystals and mother liquor are passed via line 52 to a separator 14. The separator removes the crystals from the mother liquor. A drum filter, centrifuge, belt filter or rotary filter may be used to separate the crystals.

The sodium bicarbonate crystals are transferred via line 60 to a calciner 15 where the crystals are heated up and converted into a form of sodium carbonate known as light soda ash. It is preferred to use a rotary kiln with steam-tube heating for the calciner 15, instead of a gas-fired kiln or a fluidized-bed calciner. A steam-tube calciner does not introduce diluting combustion air, so that the off-gas has a higher concentration of carbon dioxide that can be used more efficiently in the absorption tower 12.

Preferably, the light soda ash is transferred via line 64 to a densifier 16 where the light soda ash is converted to sodium carbonate monohydrate crystals. Optionally, the light soda ash can be transferred to storage for sale as a separate product. In the densifier 16, water, or alternatively, sodium carbonate solution, is added to the light soda ash, which combines and recrystallizes into sodium carbonate monohydrate. This mixture is then fed via line 66 into a centrifuge 19, or any other solid-liquid separating device, to separate the monohydrate crystals from any excess liquid. The excess liquid is recycled via line 68 to the densifier 16. The monohydrate crystals are then dried in a rotary dryer 20, and the crystal structure forms into the anhydrous product known as dense soda ash. This product is transferred via line 72 to storage.

In the calciner 15, the sodium bicarbonate crystals are thermally decomposed to sodium carbonate. This decomposition produces an off-gas containing carbon dioxide and water. This off-gas passes via line 62 to a condenser 18. The condenser recovers the heat from the off-gas and cross exchanges it with air to heat it up before introducing it via line 56 into the air stripper 17. The condensate is passed via line 36 back to the leaching circuit 11. The carbon dioxide, however, is introduced via line 42 into a carbon dioxide absorber tower 12.

The mother liquor 54 from the separator 14 has a purge stream 55 removed from it to reduce the impurities, such as organics and chlorides, circulating in the system. Because the sodium bicarbonate crystals do not retain these impurities, they concentrate in the recirculating mother liquor. Sufficient mother liquor must be purged to remove from the system about the same amount of impurities coming in with the raw trona ore. Typically, between 5 and 10% of the mother liquor is purged. The mother liquor may be first heat-exchanged with other streams in the process to improve the overall process thermal efficiency. The mother liquor is fed via line 48 into the bicarbonate crystallizer 13 cooling exchanger. The mother liquor heats up to between about 60° C. and about 80° C. depending on the type of equipment selected.

The majority of the mother liquor is fed via line 50 into a stripping column 17. Air is introduced at the bottom of the stripping column via line 56. The air is preferably passed in a counter-current stream with the mother liquor to insure intimate contact. A packed column, or a tray column, may be used for this operation. The air causes sodium bicarbonate in the solution to decompose into sodium carbonate, carbon dioxide and water. The carbon dioxide off-gas is vented via line 58. The solution is converted to a weak liquor that is sent via line 38 to the leaching circuit 11. The weak liquor may need to be heated before being introduced into the leaching circuit.

Preferably, the air feed to the stripping column is at substantially the same temperature as the mother liquor. During the extreme seasonal ambient variations, it may be necessary to heat or cool the air. To heat the air, the exhaust stream 62 from the bicarbonate calciner 15 may be used.

Air is the preferred gas to use in the stripping column because of economic considerations. However, other gases may be used. It is believed that any gas with a lower partial pressure of carbon dioxide than the partial pressure of carbon dioxide of the mother liquor fed to the stripper may be used, provided the gas is not reactive with the mother liquor and has a low boiling point, less than about 0° C., for example, so that it does not condense into the mother liquor. For example, air, nitrogen, helium or any other inert gas, or combinations thereof, with low partial pressures of carbon dioxide would meet this criteria and could be used. The gas intimately contacts the solution and causes a reduction of carbon dioxide partial pressure seen by the solution. This is believed to cause a disequilibrium between the sodium bicarbonate and carbon dioxide in solution that results in the sodium bicarbonate decomposing into sodium carbonate and carbon dioxide as it tries to restore the equilibrium.

For example, at the preferred operating conditions found in Table 1, the air has a temperature of 80° C. and a partial pressure of carbon dioxide of 0.005 psia. The mother liquor has a temperature of 80° C. and a partial pressure of carbon dioxide of 0.882 psia. At these conditions, it is calculated that about 60 percent of the sodium bicarbonate may be efficiently decomposed by air stripping.

Generally, it is preferred to operate the stripping column 17 to produce an aqueous solution containing sodium bicarbonate and sodium carbonate in a ratio between about 4:4 and about 4:5. However, the most preferred objective for the stripping column in this embodiment is to readjust the bicarbonate-carbonate concentrations in the mother liquor to approach the ratio of about 4:5 found in trona. The mother liquor in line 54 is substantially saturated in sodium bicarbonate containing little, if any, sodium carbonate. The mother liquor is converted to an unsaturated aqueous solution, or a weak liquor, containing sodium carbonate and sodium bicarbonate in the stripper 17. Being an unsaturated solution, the weak liquor is then able to dissolve significantly more amounts of trona.

This process has many advantages. Because the mother liquor is stripped with air before being recycled as a dissolving solution, it is able to dissolve more trona. Therefore, more trona can be dissolved with less recycle liquid being required. This saves energy by reducing the pumping requirements and reducing the amount of liquid continually being recycled in the process.

Likewise, this invention has the advantage that all sodium value can be recovered from the trona by adjusting the bicarbonate-carbonate ratio in the weak liquor feed to the leaching circuit. Due to the differential solubilities between sodium carbonate and sodium bicarbonate, the preferred bicarbonate-carbonate ratio of the weak liquor is that of trona, or 4:5. If in the weak liquor dissolving solution has a ratio greater than 4:5, then part of the sodium bicarbonate present in the trona will not dissolve. Therefore, by using the air stripper in the recirculating liquor circuit, the bicarbonate-carbonate ratio can be adjusted to optimize the dissolution of trona ore per pass.

Table 1 provides an example of flow rates for the major streams for the above-described process as depicted in FIG. 1 operated with a dissolving temperature of 80° C. This material balance is based on all of the sodium bicarbonate product being calcined to light soda ash and then processed into dense soda ash.

TABLE 1

(80° C.)

FLOWRATE (TPH)

| STREAM | CRYSTALS | $Na_2CO_3$ | $NaHCO_3$ | $H_2O$ | $CO_2$ | OTHER | TOTAL |
|---|---|---|---|---|---|---|---|
| 30 | — | 44.0 | 35.0 | 15.0 | — | 6.0 (insol) | 100.0 |
| 38 | — | 12.9 | 10.1 | 277.8 | — | — | 300.8 |
| 40 | — | 56.9 | 45.2 | 316.1 | — | — | 418.2 |
| 42 | | | | — | 27.4 | | |
| 46 | 68.9 | 3.7 | 60.5 | 307.1 | — | — | 440.2 |
| 50 | — | 3.7 | 24.6 | 276.3 | — | — | 304.6 |
| 52 | 102.0 | 3.7 | 27.4 | 307.1 | — | — | 440.2 |
| 56 | | | — | | 24.6 (air) | | |
| 60 | 102.0 | — | 2.7 | 30.9 | — | — | 135.6 |
| 62 | — | — | — | 42.1 | 27.4 | — | 69.5 |
| 70 | 77.3 | — | — | 3.2 | — | — | 80.5 |
| 72 | 66.1 | — | — | — | — | — | 66.1 |

Table 2 provides an example of flow rates for the major streams for the above-described process as depicted in FIG. 1 operated with a dissolving temperature of 50° C.

TABLE 2

(50° C.)

FLOWRATE (TPH)

| STREAM | CRYSTALS | $Na_2CO_3$ | $NaHCO_3$ | $H_2O$ | $CO_2$ | OTHER | TOTAL |
|---|---|---|---|---|---|---|---|
| 30 | — | 44.0 | 35.0 | 15.0 | — | 6.0 (insol) | 100.0 |
| 38 | — | 22.3 | 17.7 | 492.7 | — | — | 532.7 |
| 40 | — | 66.3 | 52.7 | 531.0 | — | — | 650.0 |
| 42 | | | | — | 27.4 | | |
| 46 | 78.7 | 5.9 | 69.8 | 520.8 | — | — | 675.2 |
| 50 | — | 5.9 | 43.7 | 489.9 | — | — | 539.5 |
| 52 | 102.0 | 5.9 | 46.4 | 520.8 | — | — | 675.1 |
| 56 | | | — | | 43.7 (air) | | |
| 60 | 102.0 | — | 2.8 | 30.9 | — | — | 135.6 |
| 62 | — | — | — | 42.1 | 27.4 | — | 69.5 |
| 70 | 77.3 | — | — | 3.2 | — | — | 80.5 |
| 72 | 66.1 | — | — | — | — | — | 66.1 |

It has been known that sodium bicarbonate in solution could be converted to sodium carbonate in solution by wet calcination. Wet calcination is typically carried out where steam is injected into an aqueous solution containing sodium bicarbonate. The heat from the steam raises the temperature of the solution to a high enough temperature for the sodium bicarbonate to undergo thermal decomposition.

In the process described above a steam stripping column could be used in place of the air stripping column. However, with the air stripping column one realizes the economic benefits and advantages of using air at substantially ambient temperatures to cause the sodium bicarbonate to convert to sodium carbonate.

EXPERIMENTS

A series of experiments were carried out using aeration to convert sodium bicarbonate into sodium carbonate in an aqueous solution. In these tests, air was sparged into a flask containing 1.5 liters of deionized water containing various amounts of dissolved sodium carbonate and sodium bicarbonate. The time count for each experiment began when the chemicals were dissolved in the deionized water. The experiments were run to compare the air sparging operation at a low temperature of 20° C. and a high temperature of 80° C.

The results for the experiments are shown in Table 3. Test Nos. 1 and 2 were conducted with two similar saturated solutions of sodium bicarbonate at about 20° C. Test No. 1 was run with a low air flow rate of 900 mL/min. Test No. 2 was run with other conditions the same, but with a higher air flow rate of about 2000 mL/min. Initially, as shown after the first hour, Test No. 2 with a greater air flow had greater conversion rates of sodium bicarbonate into sodium carbonate than Test No. 1 with a lesser air flow. However, after 8 hours of air sparging, the amount of sodium bicarbonate that converted to sodium carbonate was comparable in either case.

Likewise, Test Nos. 3 and 4 were conducted with substantially saturated solutions of sodium bicarbonate at 80° C. Similar results were observed, with higher initial rates of conversion than observed at the lower temperature in the previous tests. Also, the high air flow rate in Test No. 4 had a higher conversion rate initially, but after 24 hours appeared similar to the conversion for the lower air flow rate in Test No. 3.

Test Nos. 5 and 6 were conducted without any air sparging. Some minimal conversion was observed.

Similarly, Test No. 7 was conducted without any air sparging. However, the solution was continuously stirred. Minimal conversion of sodium bicarbonate to sodium carbonate was observed.

TABLE 3

| Test No. | Time (Hrs.) | Temp. (° C.) | Air Flow (mL/min) | $Na_2CO_3$ (wt %) | $NaHCO_3$ (wt %) |
|---|---|---|---|---|---|
| 1 | 0 | 20 | 900 | 0 | 8.6 |
| | 1 | 20 | 900 | 0.8 | 7.7 |
| | 4 | 20 | 900 | 1.3 | 6.9 |
| | 8 | 20 | 900 | 1.5 | 6.5 |
| | 24 | 20 | 900 | 2.0 | 5.6 |
| 2 | 0 | 21 | 2,000 | 0 | 8.6 |
| | 1 | 20 | 2,000 | 1.6 | 6.3 |
| | 4 | 20 | 2,000 | 1.7 | 6.2 |
| | 8 | 20 | 2,000 | 1.8 | 5.9 |
| | 24 | 18.5 | 2,000 | 2.5 | 5.1 |
| 3 | 0 | 78 | 800 | 0 | 17.0 |
| | 1 | 78 | 800 | 3.8 | 12.2 |
| | 4 | 78 | 800 | 5.2 | 9.9 |
| | 8 | 78 | 800 | 6.4 | 8.2 |
| | 24 | 78 | 800 | 9.0 | 4.5 |
| 4 | 0 | 78 | 2,000 | 3.1 | 13.2 |
| | 1 | 81 | 2,000 | 4.5 | 11.0 |

TABLE 3-continued

| Test No. | Time (Hrs.) | Temp. (° C.) | Air Flow (mL/min) | Na$_2$CO$_3$ (wt %) | NaHCO$_3$ (wt %) |
|---|---|---|---|---|---|
|   | 4  | 80   | 2,000 | 6.6 | 8.0  |
|   | 8  | 80   | 2,000 | 7.8 | 6.0  |
|   | 24 | 80   | 2,000 | 9.4 | 4.1  |
| 5 | 0  | 20.5 | 0     | 0   | 8.6  |
|   | 24 | 19   | 0     | 2.6 | 8.7  |
| 6 | 0  | 80   | 0     | 0   | 17.0 |
|   | 24 | 80   | 0     | 3.5 | 11.6 |
| 7 | 0  | 20   | 0*    | 0   | 8.6  |
|   | 1  | 20   |       | 0.4 | 8.3  |
|   | 4  | 20   |       | 0.5 | 8.1  |
|   | 8  | 20   |       | 0.7 | 7.7  |
|   | 24 | 20   |       | 1.1 | 7.3  |

*stirred

The "bicarbonate process" is one such process where this invention can be efficiently applied, as described above and shown in FIG. 1. Based on the teachings contained herein, one skilled in the art will realize that such a process can be improved by incorporation of an aeration unit. The aeration unit can be incorporated into the mother/weak liquor recycle where weak liquor is recycled to the dissolving circuit. The aeration process may operate more efficiently when the ratio of sodium bicarbonate and sodium carbonate in the mother liquor is more than 4:5. Preferably, the mother liquor would have a temperature between about 20° C. and about 99° C.

As may be appreciated by one skilled in the art, this invention can be applied to other processes. A process for recovering alkali values from trona can be improved in several ways by introducing a gas having a low partial pressure of carbon dioxide and a boiling point less than about 0° C. into the recirculating mother/weak liquor containing sodium bicarbonate and sodium carbonate, if any, in a ratio more than about 1 to 5, and converting sodium bicarbonate to sodium carbonate to increase the sodium bicarbonate dissolving capacity of the mother liquor. Preferably, greater improvements may be found where the process has a recirculating liquor that contains sodium bicarbonate and sodium carbonate in a ratio more than found in natural trona, which is about 4:5. Also, the use of air as the gas, in comparison with nitrogen or oxygen, for the stripping operation may be of great economic benefit. Aerating such a solution increases the solubility of trona in the dissolving liquor so that more trona can be dissolved therein in amounts comparable to dissolving at a higher temperature.

Likewise, this invention can be applied to other process streams and waste streams. A brine solution containing sodium carbonate and sodium bicarbonate may be aerated to increase the sodium carbonate concentration such that sodium carbonate decahydrate, or sodium sesquicarbonate, would crystallize upon cooling the solution. This offers the advantage that brine from solution mining or waste aqueous streams from soda ash process plants can have the sodium value effectively recovered without recycling the streams or using expensive evaporators.

Likewise, a weak liquor solution containing sodium bicarbonate that may be used for solution mining of trona may be aerated to reduce the amount of sodium bicarbonate present. This may enhance the ability of the solution to dissolve trona and improve the yields from solution mining.

The application of this invention is not limited to production processes based on trona ore, but finds broad application in processes based upon other mineral ores such as, but not limited to, nahcolite and wegscheiderite. Other industrial processes having streams containing bicarbonates, such as the Solvay synthetic soda ash process, may find improvement by incorporating this invention to convert bicarbonates to carbonates for the purpose of yield enhancement or production of additional by-products.

Of course, it should be understood that changes and modifications can be made to the preferred embodiments described above. It is therefore intended that the foregoing detailed description be regarded as illustrative rather than limiting, and that it be understood that it is following claims, including all equivalents, which are intended to define the scope of this invention.

What is claimed is:

1. A method for the recovery of alkali values from trona comprising:

providing a feed liquor containing sodium carbonate and sodium bicarbonate;

introducing carbon dioxide to the feed liquor to convert sodium carbonate to sodium bicarbonate;

cooling the feed liquor and precipitating some of the sodium bicarbonate thereby forming crystals in a mother liquor;

separating the sodium bicarbonate crystals from the mother liquor; and introducing air into the mother liquor to convert dissolved sodium bicarbonate to sodium carbonate, thereby forming a weak liquor, wherein the air is substantially at ambient temperature.

2. The method of claim 1 further comprising calcining the sodium bicarbonate crystals to produce light soda ash and off-gas containing carbon dioxide, and introducing the carbon dioxide into the feed liquor.

3. The method of claim 2 further comprising densifying the light soda ash to produce dense soda ash.

4. The method of claim 1 further comprising dissolving trona in weak liquor.

5. The method of claim 4 wherein the trona is dissolved at a temperature between about 50° C. and about 90° C.

6. The method of claim 5 wherein the trona is dissolved at a temperature about 80° C.

7. The method of claim 1 wherein the feed liquor is cooled to about 20° C.

8. The method of claim 1 wherein the weak liquor contains a ratio of sodium bicarbonate to sodium carbonate between about 5:5 and about 4:5 by weight.

9. A method for improving the yield of a process for recovering alkali values comprising: introducing air substantially at ambient temperature into a liquor containing sodium bicarbonate and sodium carbonate wherein the sodium bicarbonate to sodium carbonate ratio is more than about 1:5 by weight, converting sodium bicarbonate to sodium carbonate, thereby increasing the sodium bicarbonate dissolving capacity of the liquor and dissolving a sodium bicarbonate-containing mineral therein.

10. The method of claim 9 wherein the liquor sodium bicarbonate to sodium carbonate ratio is more than about 4:5 by weight. weight.

11. A method for producing sodium carbonate in an aqueous solution containing sodium bicarbonate comprising: introducing air substantially at ambient temperature into said aqueous solution to convert sodium bicarbonate into sodium carbonate.

12. The method of claim 11 further comprising feeding the aqueous solution into a vessel, feeding the air into the vessel, intimately contacting the air and the aqueous solution, stripping carbon dioxide from the solution, removing the air and carbon dioxide from the vessel and removing from the vessel the aqueous solution having increased sodium carbonate.

13. The method of claim 11 wherein the aqueous solution is contacted with a countercurrent stream of the air.

14. The method of claim 11 wherein the solution is sparged with the air.

15. The method of claim 11 wherein the solution is agitated and the air contacts the surface of the solution.

16. The method of claim 11 wherein the air is substantially at about the temperature of the aqueous solution.

17. The method of claim 11 wherein the aqueous solution is between about 20° C. and about 99° C.

18. The method of claim 11 wherein the aqueous solution contains a ratio of sodium bicarbonate to sodium carbonate more than about 1:5 by weight.

* * * * *

UNITED STATES PATENT AND TRADEMARK OFFICE
CERTIFICATE OF CORRECTION

PATENT NO. : 5,989,505
DATED : November 23, 1999
INVENTOR(S) : V. M. Zolotoochin et al.

It is certified that error appears in the above-identified patent and that said Letters Patent is hereby corrected as shown below:

In claim 9, line 2, delete ":" (colon) immediately after "comprising".

In claim 10, line 3, delete "weight. weight." and substitute --weight.-- in its place.

In claim 11, line 3, delete ":" (colon) immediately after "comprising".

Signed and Sealed this

Twenty-second Day of May, 2001

Attest:

NICHOLAS P. GODICI

Attesting Officer   Acting Director of the United States Patent and Trademark Office